Nov. 5, 1957   H. NERWIN   2,811,908
RANGEFINDER DEFLECTING SYSTEM FOR PHOTOGRAPHIC CAMERAS
Filed June 3, 1952   2 Sheets-Sheet 1
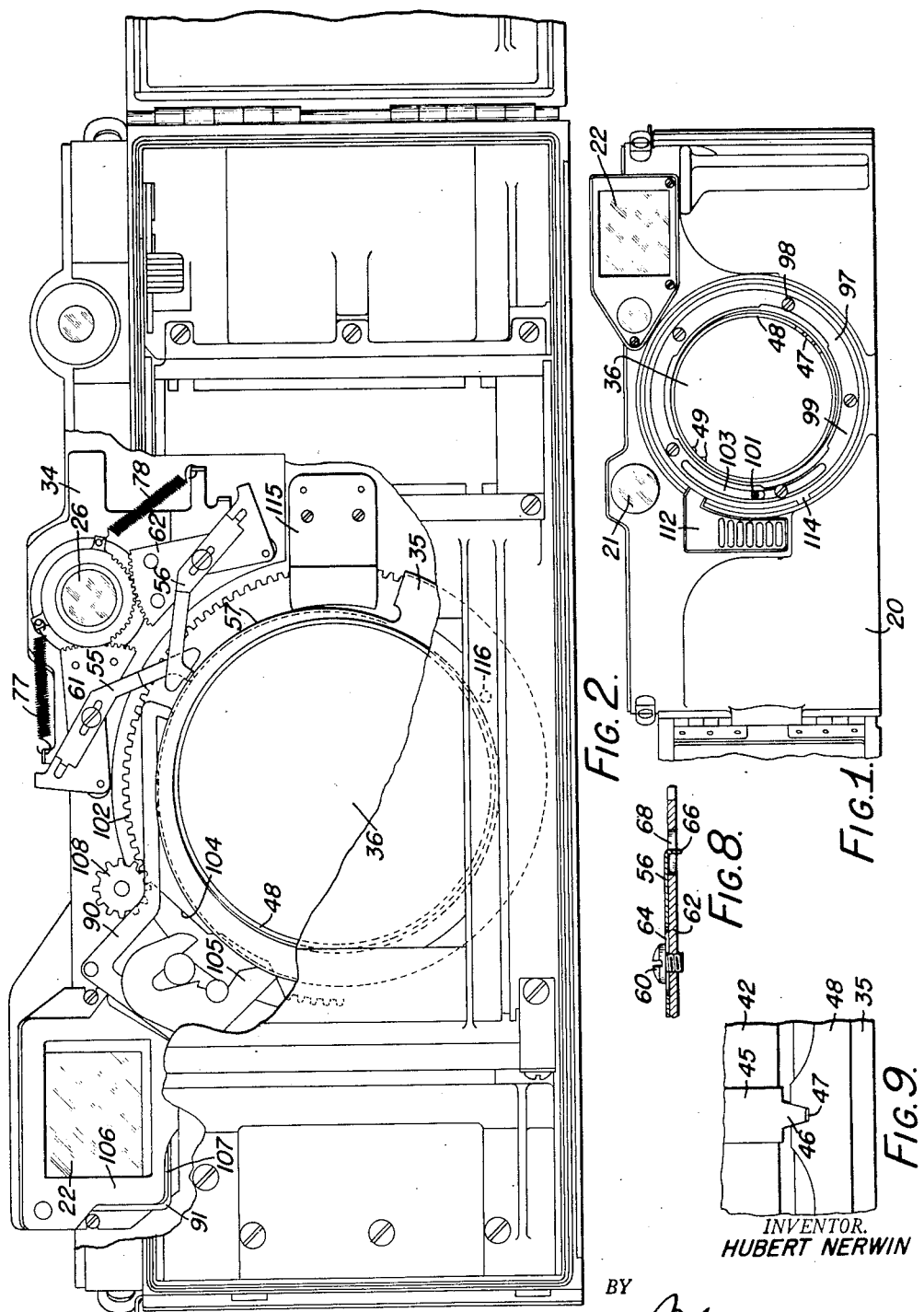
INVENTOR.
HUBERT NERWIN
BY
ATTORNEY Nov. 5, 1957  H. NERWIN  2,811,908
RANGEFINDER DEFLECTING SYSTEM FOR PHOTOGRAPHIC CAMERAS
Filed June 3, 1952  2 Sheets-Sheet 2
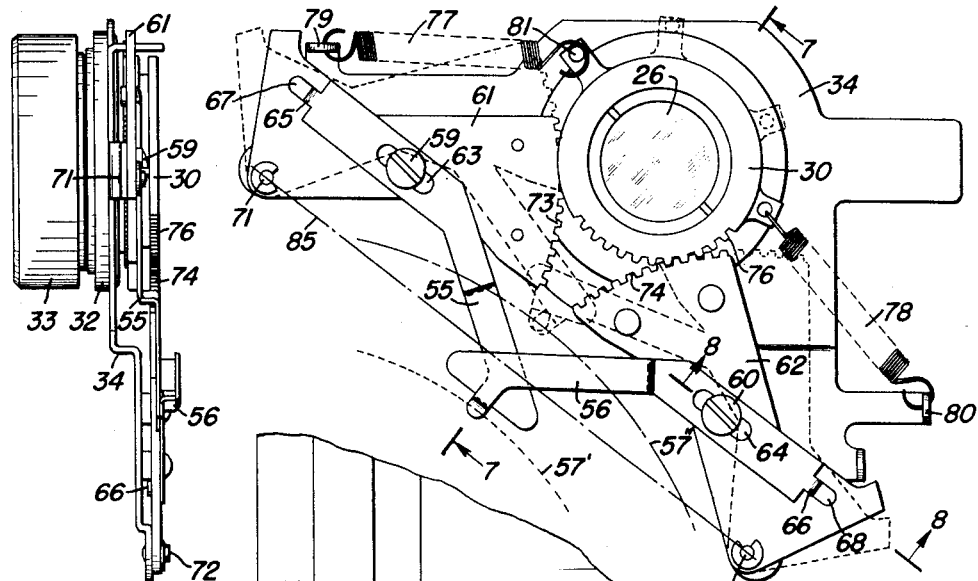
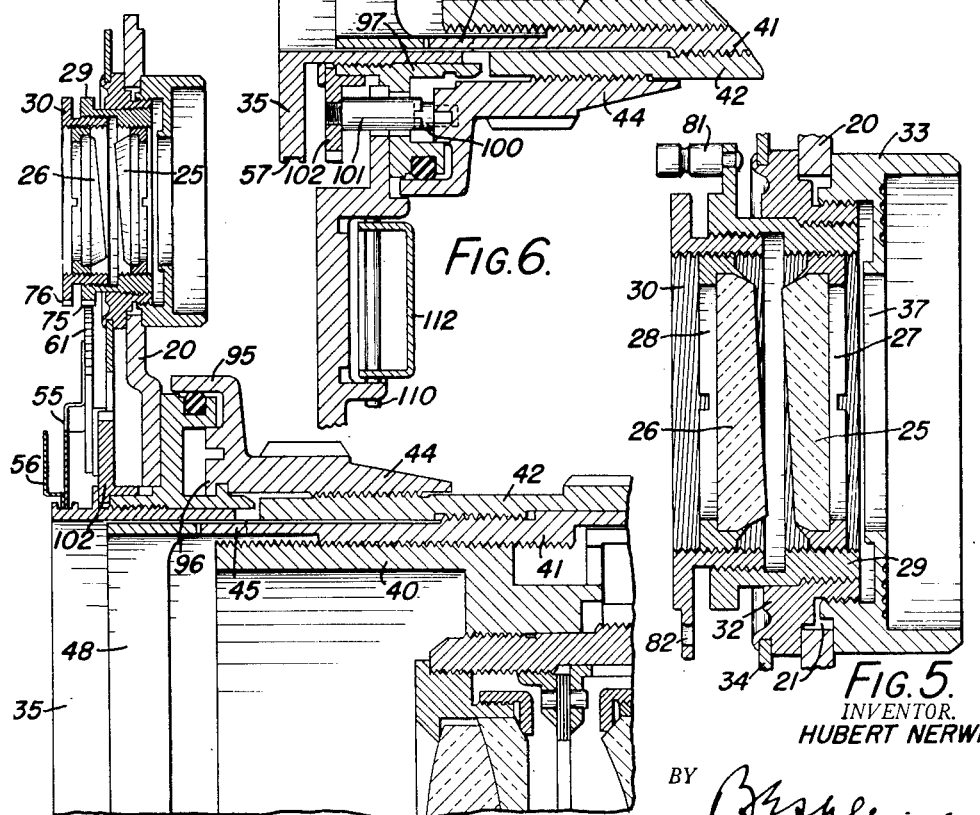
INVENTOR.
HUBERT NERWIN
BY
ATTORNEY

United States Patent Office 2,811,908
Patented Nov. 5, 1957

2,811,908

RANGEFINDER DEFLECTING SYSTEM FOR PHOTOGRAPHIC CAMERAS

Hubert Nerwin, Irondequoit, N. Y., assignor to Graflex, Inc., Rochester, N. Y., a corporation of Delaware Application June 3, 1952, Serial No. 291,441

4 Claims. (Cl. 95—44)

The present invention relates to photographic cameras and more particularly to a photographic camera having a base rangefinder which is adapted to be coupled with the objective lens mount used on the camera. In a more specific aspect, the invention relates to the deflecting system of a coupled rangefinder and to means for compensating for manufacturing tolerances in this system. In a still more specific aspect, the invention relates to a camera having a coupled rangefinder in which the deflecting system includes a pair of axially-aligned rotary optical wedges, which are rotated relative to one another on focusing adjustment of the objective focusing mount by a cam, or other actuating means, coupled to the objective focusing mount, and in which means is provided for compensating for manufacturing tolerances in the optical wedges and in the cam or other actuating means.

It is common to couple the means for effecting focusing adjustment of a photographic objective mount with the ray deflecting system of a rangefinder. It is also known that two axially-aligned rotary optical wedges, which are rotatable simultaneously in opposite directions, may be employed as the deflecting means for the rangefinder. Such wedges have great advantage for deflection purposes. Both wedges may have as much as sixty degrees of operative movement, and the movements of the two wedges are additive so that together they have one hundred and twenty degrees of movement which makes them forty times as accurate as a tilting mirror deflector.

There have been drawbacks to optical wedges heretofore, however, which have restricted their use. It is impossible from a practical standpoint to make these optical wedges with absolute accuracy; it would cost too much to produce them. It is, also, impossible from a practical standpoint to make with absolute accuracy the cam or other means for rotating the wedges relative to one another as the photographic objective mount is adjusted during focusing. Tolerances must be allowed both in the manufacture of the wedges and of the cam, or other actuating means, if the wedges are to be produced at a practical cost and if the deflecting system employing them is itself to be practical.

The optical wedges have been mounted in a threaded sleeve so that they may be adjusted angularly relative to one another about their common axis to compensate for certain tolerances in manufacture, but such adjustment permits only of adjusting the wedges relative to one another to be correct at one end of the effective focusing range of the objective focusing mount. Usually the two wedges are adjusted angularly relative to one another about their common axis until they are correct for the infinity position of the objective lens. If there are any errors in the wedges, these errors will then appear at the low end of the range of focusing adjustment of the objective focusing mount. This, however, is extremely unsatisfactory, especially for precision cameras, for it is impossible to take close-ups without blurring.

One object of the present invention is to provide a simple means for compensating for manufacturing tolerances in a pair of axially-aligned rotary optical wedges so that they may be employed in the deflecting system of a coupled photographic rangefinder.

Another object of the invention is to provide a deflecting system for coupled rangefinders of photographic cameras, in which rotary optical wedges are employed as the ray deflecting means, which will permit of compensating for manufacturing tolerances both in the rotary optical wedges themselves and in the cam or other means employed for actuating the wedges during focusing adjustment of the objective focusing mount that is coupled to the rangefinder.

Another object of the invention is to provide a deflecting system of the character described in which the ratio between the cam movement and the movements of the optical wedges can be adjusted to compensate simultaneously for manufacturing tolerances in the wedges and in the cam.

Still another object of the invention is to provide means for compensating for manufacturing tolerances in the rotary optical wedges and in the cam for actuating the same, which will render the wedges accurate as ray-deflecting means for the particular range of movement of the wedges used in the rangefinder.

Other objects of the invention will be apparent hereinafter from the specification and from the recital of the appended claims.

In the drawings:

Fig. 1 is a front view of a camera constructed according to one embodiment of the present invention, the door at the rear of the camera being shown fragmentarily, also, and open;

Fig. 2 is a rear elevation of this camera, on an enlarged scale, with the door shown fragmentarily and open, and with parts of the camera broken away to show the deflecting mechanism of the rangefinder, the cam which operates the same, and other parts of the camera structure;

Fig. 3 is a fragmentary rear elevation on a considerably enlarged scale showing the deflecting mechanism of the rangefinder;

Fig. 4 is a view at right angles to Fig. 3;

Fig. 5 is an enlarged axial section through the rotary optical wedges and their mountings;

Fig. 6 is a fragmentary axial section on an enlarged scale showing how an objective focusing mount is coupled to the cam which operates the deflecting mechanism of the rangefinder;

Fig. 7 is a fragmentary axial section through the objective focusing mount taken substantially at right angles to the plane of Fig. 6 and along the line 7—7 of Fig. 3;

Fig. 8 is a fragmentary section on the line 8—8 of Fig. 3, looking in the direction of the arrows; and Fig. 9 is a fragmentary view looking at the inside of the barrel of the objective focusing mount and of the cam which controls the deflecting system of the rangefinder, and showing the means for coupling the objective focusing mount to this cam.

Referring now to the drawings by numerals of reference, 20 denotes the camera casing. This casing has in its front wall two openings 21 and 22 for the windows through which the subject, that is to be photographed, is viewed in the rangefinder. The viewfinder or eyepiece of the rangefinder (not shown) is mounted in the rear wall of the camera casing 20 in axial alignment with the window opening 22.

The ray-deflecting means of the rangefinder is mounted in the opening 21. This ray-deflecting means comprises two optical wedges 25 and 26 (Figs. 5 and 7) which are secured in rings 27 and 28, respectively. The ring 27 is threaded into a sleeve 29 for adjustment therein. The ring 28 is threaded into a sleeve 30 for rotary adjustment therein. The sleeve 30 is threaded into the sleeve 29 for rotary movement therein; and the sleeve 29 is threaded into a clamping ring 32 for rotary movement therein. Clamping ring 32 is adapted to seat against the rear face of the front wall of the camera casing 20 and is held thereagainst by a combined clamping ring and protective shade 33 that threads onto the clamping ring 32. Member 33 has a central opening 37 in which a plain glass window may be secured to protect the wedges against dust and damage. By rotating member 33, this member and the clamping ring 32 may be drawn against the front and rear faces of the front wall of the casing 20, respectively, to clamp the deflecting means of the rangefinder in the window opening 21.

The optical wedges 25 and 26 may be of conventional construction. They have the same deflecting power and are adapted to be rotated relative to one another in opposite directions about their common axis during focusing of the objective focusing mount used on the camera in order to operate the rangefinder. The movement of the wedges may be produced by rotation of a cam 35 (Fig. 2). This cam is mounted for rotation in an opening 36 in the front wall 20 of the camera casing; and the objective focusing mount, which is being used on the camera, is mounted in axial alignment with this cam and coupled thereto in such wise as to rotate the cam as the objective focusing mount is adjusted in focusing.

Objective focusing mounts used with a camera constructed according to the present invention may be of standard construction so far as the lens systems of the objective focusing mounts are concerned. Suffice it to say that the lens system of each objective mount is carried in a barrel 40 (Figs. 6 and 7) that is mounted in a sleeve 41 which threads externally on the barrel 40 and which threads internally into a sleeve 42. Sleeve 41 is provided for adjustment of the objective focusing mount in the factory. It may be secured fixedly to the sleeve 40 after adjustment. Threaded on the sleeve 42 but fixedly secured thereto, after adjustment, is the adjusting sleeve 44.

Formed integral with the sleeve 41 and projecting rearwardly therefrom is a dog or lug 45 (Figs. 6, 7 and 9) which is provided with a finger 46 that is adapted to engage in a recess 47 of a spring ring 48. This ring is riveted at a point diametrically opposite the recess 47 and as indicated at 49 (Fig. 1) to the inside of the control cam 35. Hence, the objective mount is adjusted in focusing, the cam 35 is rotated.

The cam 35 operates the deflecting mechanism of the rangefinder through a pair of levers 55 and 56 (Figs. 2, 3, 4 and 7). These levers engage at one end with the peripheral groove 57 (Fig. 6) in the cam. They are connected by screw studs 59 and 60, respectively, with lever arms 61 and 62, respectively. The screw studs 59 and 60 pass through elongated slots 63 and 64, respectively, in the levers 55 and 56, respectively, and thread into the lever arms 61 and 62, respectively. The levers 55 and 56 have downturned ends 65 and 66, respectively, which engage in slots 67 and 68, respectively, in the lever arms 61 and 62, respectively. The levers 55 and 56 are bent at their free ends relative to one another, as clearly shown in Figs. 3, 4 and 7 so that they can engage in the same track 57 of the cam 35.

The lever arms 61 and 62 are pivotally mounted in the front wall of the camera casing on pins 71 and 72, respectively. They have toothed segments 73 and 74, respectively, integral with them. The toothed segments 73 and 74 engage coaxial toothed segments 75 and 76, respectively, that are formed integral with the rings 29 and 30, respectively, so that, as the levers 55 and 56 are moved by the cam 35 in its rotation, during focusing adjustment of the focusing objective mount, the optical wedges 25 and 26 are moved angularly relative to one another about their common axis to deflect the rays from the subject in correspondence with the focusing adjustment of the objective focusing mount.

Coil springs 77 and 78 serve to take up the backlash in the gearing and to hold the levers 55 and 56 in engagement with the cam 35. The spring 77 engages at one end with a lug 79 fixed to the camera casing and at its opposite end with a pin 81 that is riveted to the sleeve 29. The spring 78 is secured at one end to a lug 80 that is fixed to the camera casing and at its opposite end in a hole 82 in the sleeve 30.

The lens-carrying rings 27 and 28 are adjustable relative to one another about their common axis in the sleeves 29 and 30, respectively, to permit adjustment of the images seen through the windows 21 and 22, respectively, so that there will be no double image at the infinity position, of an objective focusing mount but instead these images will be superimposed upon one another at the infinity position of any objective lens mount used in the camera. To compensate for manufacturing tolerances in thickness of the optical wedges 25 and 26, either plus or minus, the levers 55 and 56 may be adjusted relative to the lever arms 61 and 62, respectively, to shorten or lengthen, respectively, the distances between the points of contact of the levers and the pivot points 71 and 72, respectively, of the lever arms that are actuated thereby. These same adjustments of the levers 55 and 56 on the lever arms 61 and 62, respectively, permit of compensating for manufacturing tolerances in the cam track 57. The levers 55 and 56, in other words, permit of adjustment of the ratio between the cam movement and the movements of the optical wedges.

Preferably the pivot points 71 and 72 of the lever arms 61 and 62 are on a line 85 (Fig. 3) that passes midway between the high and low parts of the effective portion of track 57 of cam 35. These are denoted at 57′ and 57″, respectively, in Fig. 3. In this figure, the levers 55 and 56 and associated parts are shown in full lines in the positions they occupy when levers 55 and 56 are riding on the low portion 57′ of the cam track, and in dotted lines in the positions they occupy when these levers are riding on the high portion 57″ of the cam track. This permits of maintaining substantially equal angles of movement of the lever arms 61 and 62 above and below their central positions in all positions of adjustment of levers 55 and 56 on the lever arms.

The optical wedges may be used with any means for transmitting the rays from the deflecting means to the viewfinder or eyepiece of the rangefinder. They may be used, for instance, with a pivoted reflector or mirror. A preferred type of rangefinder in which the optical wedges are employed is described in my pending application Serial No. 318,231, filed November 1, 1952.

The cam 35 is used not only to operate the deflecting mechanism of the rangefinder, but may also be used for operating the parallax mechanism of the combined rangefinder and viewfinder of the camera, as described more fully in my copending application Serial No. 288,511, filed May 17, 1952, now Patent No. 2,719,454. The parallax mechanism is operated through a lever 90 (Fig. 2) which is secured to the parallax slide 91. This mechanism forms no part of the invention claimed herein, and therefore need not be described further here.

A stop 115 (Fig. 2) is secured in the casing to limit the rotary movement of the cam 35 by engagement with a stop pin 116 on the cam.

Objective focusing mounts of different focal lengths may be used on the camera, as, for instance, mounts for wide angle, normal angle, and telescopic lenses. Each objective focusing mount may be coupled to the camera in any suitable fashion as, for instance, by a bayonet lock. The sleeve 44 (Figs. 6 and 7) of each objective mount has a skirt portion 95. This skirt portion may be provided with three angularly spaced lugs 96, as more fully described in my co-pending application Serial No. 279,011, filed March 28, 1952, that project radially inwardly, and which form one part of the bayonet lock. Surrounding the opening 36 (Fig. 1) in the front wall of the camera casing is a collar 97 which is secured to the front wall of the camera casing by screws 98. Integral with this collar are three equi-angularly spaced lugs 99 that form the other part of the bayonet lock.

Mounted in the rear face of the sleeve portion 44 of each objective focusing mount, except for one (preferably the one for the shortest focal length lens) is a pin 100 (Fig. 6). The pin 100 in each objective focusing mount, except for the one, is located at a different angular position about the axis of the objective focusing mount. The pins 100 are adapted to engage a pin 101 which is secured to a gear 102. This gear is rotatably mounted on the collar 97. The pins extend through an arcuate slot 103 (Fig. 1) in the collar to engage one another (Fig. 6).

The pins 100 of the different objective focusing mounts, are, as stated, arranged in different angular positions around the axes of their respective mounts so that, when rotating these different focusing mounts to couple them by means of the bayonet lock connection to the camera casing, the different mounts will be rotated different amounts before their respective pins 100 engage pin 101. Hence, in coupling different objective focusing mounts as, for instance, wide angle, normal angle, and telephoto lens focusing mounts to the camera, the gear 102 and its cam surface will be rotated not at all, for the wide-angle focusing mount, for instance, and different amounts, respectively, for the other focusing mounts.

The gear 102 is formed with a cam surface 104 (Fig. 2). This cam surface is adapted to be engaged by a roller or follower carried by a hook member 105. This hook member serves as a control means for movement of the masking frames 106 and 107 which control the size of the area of the field of view of the viewfinder of the camera, as described in my application Serial No. 288,-511, above mentioned. The gear 102 meshes with a pinion 108 which controls the magnification of the viewfinder and rangefinder, as described in my application Serial No. 352,768, filed May 5, 1953. These features form no part of the invention claimed herein, and for that reason need not further be descrbied here.

There is an arcuate slot in the skirt portion 95 of each objective focusing mount. Pivotally mounted upon a pin 110 (Fig. 6) in a recess in the front wall of the camera casing is a detent 112 (Fig. 1). This detent is pressed forward by a leaf spring (not shown) which is interposed between the detent and the front face of the casing. When an objective mount has been coupled to the camera by the bayonet lock connection this detent cooperates with a lug 114 (Fig. 1) to prevent further angular movement of the objective mount. One of the bounding walls of the slot in the skirt portion of the objective focusing mount comes into engagement with the stop lug 114 that is integral with the collar 97. Immediately after the skirt has passed over the detent the detent snaps back into position to lock the objective focusing mount against rotation in one direction, while the stop lug locks it against rotation in the other direction. The bayonet lock holds it to the camera casing.

To remove the objective focusing mount from the camera housing, spring finger 112 is depressed and the objective focusing mount is rotated to align the lugs of the mount with the spaces between the bayonet lock lugs of the camera casing. Then the objective mount is withdrawn axially.

While the invention has been described in connection with a camera in which the objective lens mounts are removable and interchangeable, obviously it may be employed also where the objective lens mount forms a permanent part of the camera. Thus, the invention may be used, for instance, in a camera where the objective lens is mounted upon a lens board that is slidably adjustable on the camera bed for focusing; and the camera bed, furthermore, may be rigid with the camera casing or of the folding type. Movement of the lens board may rotate the control cam 35, for instance.

While the invention has been described, then, in connection with a particular embodiment thereof, it will be understood that it is capable of further modification; and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention what I claim is:

1. The combination in a photographic camera having an objective lens focusing mount that is adjustable for focusing, of a deflecting system for a coupled rangefinder comprising a pair of axially-aligned rotary optical wedges, a rotary cam having an active surface disposed about and at a varying distance from its axis of rotation, said cam being rotatable about an axis parallel to the axis of said wedges and being connectable to said lens mount to be coaxial therewith and to be rotated on focusing adjustment of said lens mount, a lever operatively connecting each of said wedges to the cam to rotate the wedges about their common axis on rotation of the cam, said levers being mounted to pivot about separate axes equally spaced from the axis of said wedges and disposed, respectively, at opposite sides of the axis of said wedges, to rotate said wedges in opposite directions on rotation of said cam, and each of said levers being adjustable for length, the two levers being positioned to contact said cam simultaneously at substantially the same angular position about the axis of said cam, and the points of contact of the two levers with said cam being substantially equally spaced from the respective pivot axes of the two levers.

2. The combination in a photographic camera having an objective lens focusing mount that is adjustable for focusing, of a deflecting system for a coupled rangefinder comprising a pair of axially-aligned rotary optical wedges, a rotary cam having an active surface disposed about and at a varying distance from its axis of rotation, said cam being rotatable about an axis parallel to the axis of said wedges and being connectable to said lens mount to be coaxial therewith and to be rotated on focusing adjustment of said lens mount, a first pair of arms, a second pair of arms, said second pair of arms being pivotally mounted in the camera for pivotal movement about axes which are, respectively, equally spaced from the axis of said wedges and which are parallel to the axes of the cam and of the wedges and which are disposed at opposite sides, respectively, of the axis of the wedges, each arm of said first pair engaging with said cam, the two arms of said first pair being positioned to engage said cam simultaneously at substantially the same angular position about the axis of said cam, means adjustably connecting each arm of said first pair to one arm of the second pair of arms to transmit motion from said cam to the arms of the second pair, the points of engagement of the two arms of said first pair with said cam being substantially equally spaced from the pivot axes of the arms of the second pair, means connecting each of the arms of said second pair with one of said wedges to oscillate a wedge on pivotal movement of the associated arm of the second pair, said connecting means between each arm of the first pair and the associated arm of the second pair permitting variation of the distance between the point of engagement of each arm of the first pair with the cam and the point of connection of each arm of the first pair with the associated arm of the second pair.

3. The combination in a photographic camera having an objective lens focusing mount that is adjustable for focusing, of a deflecting system for a coupled rangefinder comprising a pair of axially-aligned rotary optical wedges, means for adjusting said wedges rotatably and axially relative to one another on their common axis, a rotary cam, said cam being rotatable about an axis parallel to the axis of said wedges and having an active surface disposed about and at a varying distance from its own axis, means connecting said cam to said lens mount to rotate said cam on focusing adjustment of said lens mount, separate levers separately pivoted in said camera for pivotal movement about axes parallel to the axes of the wedges and cam, the pivotal axes of said levers being substantially equally spaced from the axis of said wedges and being disposed, respectively, at opposite sides of the axis of said wedges, an arm connecting each of said levers to said cam to rock said levers about their respective pivotal axes on rotation of said cam, said arms being positioned to engage said cam simultaneously at substantially the same angular position about the axis of said cam, the points of engagement of said arms with said cam being substantially equally spaced from the pivotal axes of said levers, means connecting said levers to said wedges to rotate said wedges in opposite directions about their common axis on rotation of said cam, and means for separately adjusting the distance between the point of connection of each arm with its lever and the point of connection of each arm with the cam.

4. The combination in a photographic camera having an objective lens focusing mount that is adjustable for focusing, of a deflecting system for a coupled rangefinder comprising a pair of axially-aligned rotary optical wedges, a rotary cam mounted coaxially with said focusing mount to rotate about an axis parallel to the axis of said wedges, said cam having an active surface disposed about and at a varying distance from its own axis, means connecting said cam to said focusing mount to rotate said cam on focusing adjustment of said focusing mount, a pair of levers mounted in said camera for pivotal movement about axes equally spaced from the axis of said wedges and disposed, respectively, at opposite sides of the axis of said wedges, the pivotal axis of each lever being disposed intermediate the ends of the lever and being parallel to the axes of said cam and said wedges, both of said levers being operatively connected at one end to said cam to have contact with said cam simultaneously substantially at the same angular position about the axis of said cam, and means connecting each of said levers at its other end to one of said wedges to rotate said wedges in opposite directions on rotation of said cam, the points of contact of the two levers with said cam being substantially equally spaced from the pivotal axes of the two levers, and each of said levers comprising two parts that are connected together, the point of connection of the two parts of each lever being adjustable to adjust its effective length.

References Cited in the file of this patent
UNITED STATES PATENTS

| | | |
|---|---|---|
| 1,178,474 | Becker | Apr. 4, 1916 |
| 2,040,050 | Kuppenbender | May 5, 1936 |
| 2,150,544 | Eppstein | Mar. 14, 1939 |
| 2,273,355 | Hineline | Feb. 17, 1942 |
| 2,655,832 | Mihalyi et al. | Oct. 20, 1953 |